(12) United States Patent
Hanson

(10) Patent No.: US 12,349,833 B1
(45) Date of Patent: Jul. 8, 2025

(54) PORTABLE FOOD WARMER

(71) Applicant: Julanna C. Hanson, Fort Lauderdale, FL (US)

(72) Inventor: Julanna C. Hanson, Fort Lauderdale, FL (US)

( * ) Notice: Subject to any disclaimer, the term of this patent is extended or adjusted under 35 U.S.C. 154(b) by 891 days.

(21) Appl. No.: 17/538,102

(22) Filed: Nov. 30, 2021

Related U.S. Application Data

(60) Provisional application No. 63/119,053, filed on Nov. 30, 2020.

(51) Int. Cl.
| | | |
|---|---|---|
| *A47J 36/24* | (2006.01) | |
| *A47J 36/32* | (2006.01) | |
| *B65D 81/34* | (2006.01) | |
| *H05B 1/02* | (2006.01) | |
| *H05B 3/06* | (2006.01) | |

(52) U.S. Cl.
CPC ........... *A47J 36/2483* (2013.01); *A47J 36/32* (2013.01); *B65D 81/3476* (2013.01); *H05B 1/0225* (2013.01); *H05B 1/0261* (2013.01); *H05B 3/06* (2013.01)

(58) Field of Classification Search
CPC ... A47J 36/2483; A47J 36/32; B65D 81/3476; H05B 1/0225; H05B 1/0261; H05B 3/06
See application file for complete search history.

(56) References Cited

U.S. PATENT DOCUMENTS

| | | | | |
|---|---|---|---|---|
| 3,869,595 A | * | 3/1975 | Collins | A45C 11/20 99/413 |
| 5,948,309 A | * | 9/1999 | Nelson | A47J 36/027 219/734 |
| 6,018,143 A | | 1/2000 | Check | |
| 6,222,160 B1 | | 4/2001 | Remke et al. | |
| 6,861,628 B2 | | 3/2005 | Owens et al. | |
| 6,947,664 B1 | | 9/2005 | Yeh | |
| 7,122,763 B1 | | 10/2006 | Loiu et al. | |
| 7,491,912 B1 | * | 2/2009 | Check | B65D 33/16 219/385 |
| 2002/0175159 A1 | * | 11/2002 | Owens | A47J 47/145 219/521 |
| 2007/0045304 A1 | * | 3/2007 | Liang | A47J 36/06 219/735 |
| 2007/0202724 A1 | * | 8/2007 | Neumann | H01R 13/6675 439/172 |
| 2008/0245784 A1 | * | 10/2008 | Lawrence | H05B 3/68 29/592.1 |
| 2009/0096399 A1 | * | 4/2009 | Chen | H01M 10/44 307/81 |
| 2014/0027423 A1 | * | 1/2014 | Takada | H05B 1/0202 219/130.01 |
| 2015/0253055 A1 | * | 9/2015 | Tsui | B62B 1/12 280/655 |
| 2016/0367074 A1 | * | 12/2016 | Kao | A47J 36/06 |
| 2019/0223645 A1 | * | 7/2019 | Gauss | F28F 3/025 |
| 2022/0081163 A1 | * | 3/2022 | Adams | A47G 19/2288 |

* cited by examiner

*Primary Examiner* — Elizabeth M Kerr
*Assistant Examiner* — Keith Brian Assante
(74) *Attorney, Agent, or Firm* — Cramer Patent & Design, PLLC.; Aaron R. Cramer

(57) ABSTRACT

A portable food warmer comprises a collapsible plastic dish and a warming cover. The warming cover comprises an expandable material having an elastic periphery and a plurality of heating elements. A temperature controlling mechanism is disposed between the power supply and warming cover.

2 Claims, 6 Drawing Sheets

PORTABLE FOOD WARMER

RELATED APPLICATIONS

The present invention is a continuation of U.S. Provisional Application No. 63/119,053 filed on Nov. 30, 2020, the entire disclosures of which are incorporated herein by reference.

FIELD OF THE INVENTION

The present invention relates generally to a portable electrical device capable of warming foodstuffs therein.

BACKGROUND OF THE INVENTION

When traveling away from home there are limited options to warm food. While some work locations or hotels may have microwaves available, many do not. Those wishing for a warm lunch or dinner have no option other than to go to a restaurant and purchase a meal. This quickly becomes cost prohibitive when done for every meal over multiple days. Then, should leftovers be present, they must be simply discarded as there is no way to warm them later. These same problems are present for students living in dormitories where space or power limitations prevent the use of microwaves or hotplates. Campers or hunters who may have access to AC power through a generator or vehicle inverter also suffer the same problems when warming food. Accordingly, there exists a need for a means by which a warm meal can be prepared anywhere without the need for an oven or microwave. The use of the portable food warmer allows for warming of food almost anywhere in a manner which is quick, easy, and effective.

SUMMARY OF THE INVENTION

In view of the foregoing references, the inventor recognized the aforementioned inherent problems and observed that there is a need for a portable food warmer that has, a base having a base first segment, a base second segment, a base third segment, a plurality of sides, and an open top, a cover having a means for heating capable of being in electrical communication with a power supply, a thermal bag having a bag interior where a plurality of foodstuffs reside, a controller wired electrically via a primary electrical cord and a secondary electrical cord. The controller controls the means for heating in the cover, and a flap extending from one side of the thermal bag. The foodstuffs are placed in the base, while the cover is removably affixed to the base and adapted to be placed in electrical communication with the power source. The flap includes a first fastener disposed on an exterior of the thermal bag.

The base first segment may form a floor of the base, the base second segment may be attached to and nesting within the base first segment or may be expanding away therefrom, and the base third segment may be attached to and nesting within the base second segment or may be expanding away therefrom. The base may be made of an inert and resilient material that withstands one or more impact forces and one or more elevated temperatures. The base second segment may have a perimeter slightly larger than the base first segment and the base third segment has a perimeter slightly larger than the base second segment. The cover may incorporate the means for heating that is capable of providing heat in relation to an electrical connection. The means for heating may be a set of resistant heating elements. The cover may be a flexible and dome-like structure with an open bottom end. The cover may withstand an elevated means for heating and also withstands a force of impact. A perimeter of the open bottom end may be an elastic band capable of removable securement of the cover about a base perimeter edge to cover the base, a base interior, and the foodstuffs. The inner surface of the cover may include a plurality of vents, each of the vents in fluid communication with the means for heating, so as to convey the heat produced by the means for heating to the base interior when the cover is attached to the base. The vents may be disposed on an interior of the cover.

The portable food warmer may further comprise an electrical heater that may be disposed in an interstitial space between the cover and the vents. The portable food warmer may further comprise a voltage-current-frequency regulator converting a plurality of inputs into a standard voltage, current and frequency needed by the electrical heater. The foodstuffs may be separately transported in the thermal bag, such that cold food remains cold until warmed by the portable food warmer and warmed food remains warmed when held within the thermal bag. The thermal bag may be made out of material that prevents thermal communication with an exterior environment. The controller may be in-line with the primary electrical cord and via manipulation by a controller interface that provides a plurality of specific heating capabilities to the means for heating. The specific heating capabilities may be a timer or a rheostat. The resultant power from the voltage-current-frequency regulator may be controlled by the controller interface before being passed to the electrical heater.

The secondary electrical cord may be selected from the group consisting of a twelve-volt direct current cord with a cigarette lighter plug in a motor vehicle, an AC power plug for use with one hundred twenty-volt alternating current, or a USB power cord with a USB power plug for use with one or more USB power supplies and one or more USB battery power packs. An opposing side of the thermal bag from the flap may have a second fastener which may be capable of mating with the first fastener to seal the flap to the thermal bag and protect the foodstuffs held within the bag interior.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
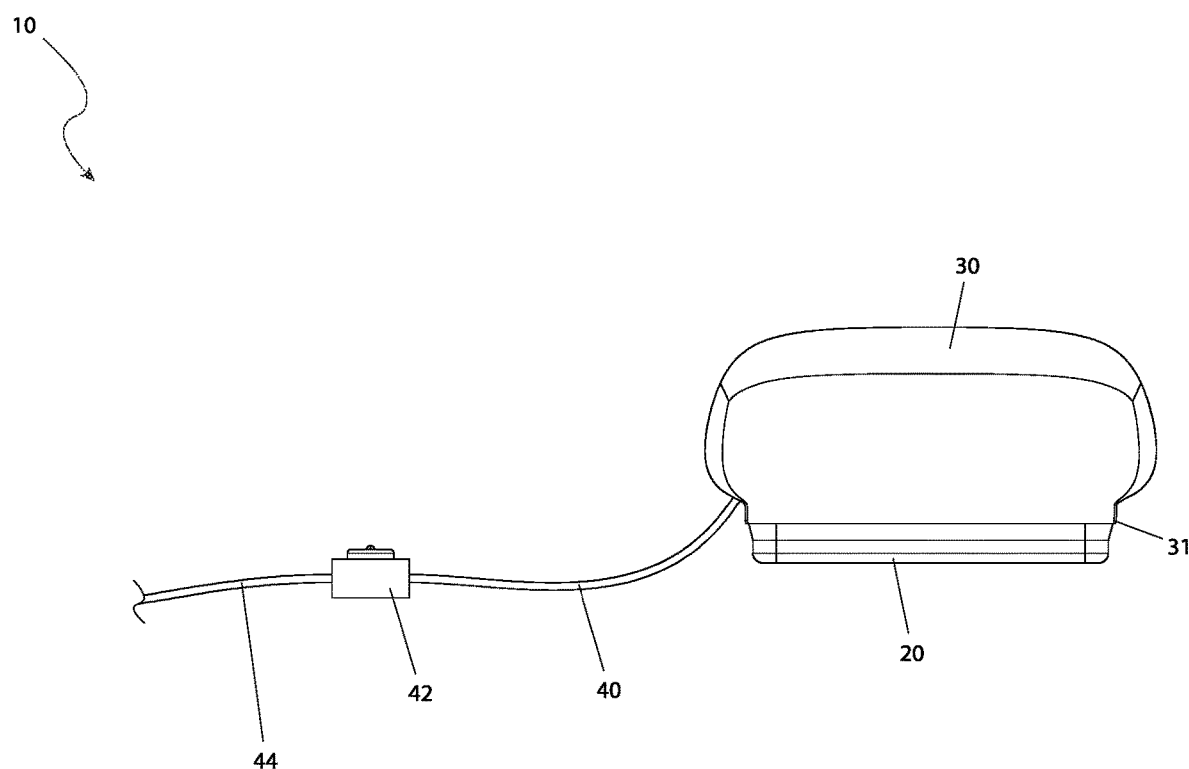
FIG. 1 is a side elevation view of a portable food warmer, according to a preferred embodiment of the present invention.

DESCRIPTIVE KEY 10 portable food warmer
20 base
21 base perimeter edge
22a base first segment
22b base second segment
22c base third segment
23 base interior
30 cover
31 elastic band
32 vent
40 primary electrical cord
41 plug
42 controller
43 controller interface
44 secondary electrical cord
50 thermal bag
51 flap
52 bag interior
53a first fastener
53b second fastener
60 twelve-volt direct current (12 VDC) cord
65 cigarette lighter plug
70 AC power cord
75 AC power plug
80 USB power cord
85 USB power plug
90 electrical heater
95 interstitial space
100 thermal energy
105 voltage-current-frequency regulator

DESCRIPTION OF THE INVENTION

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Figure 5:
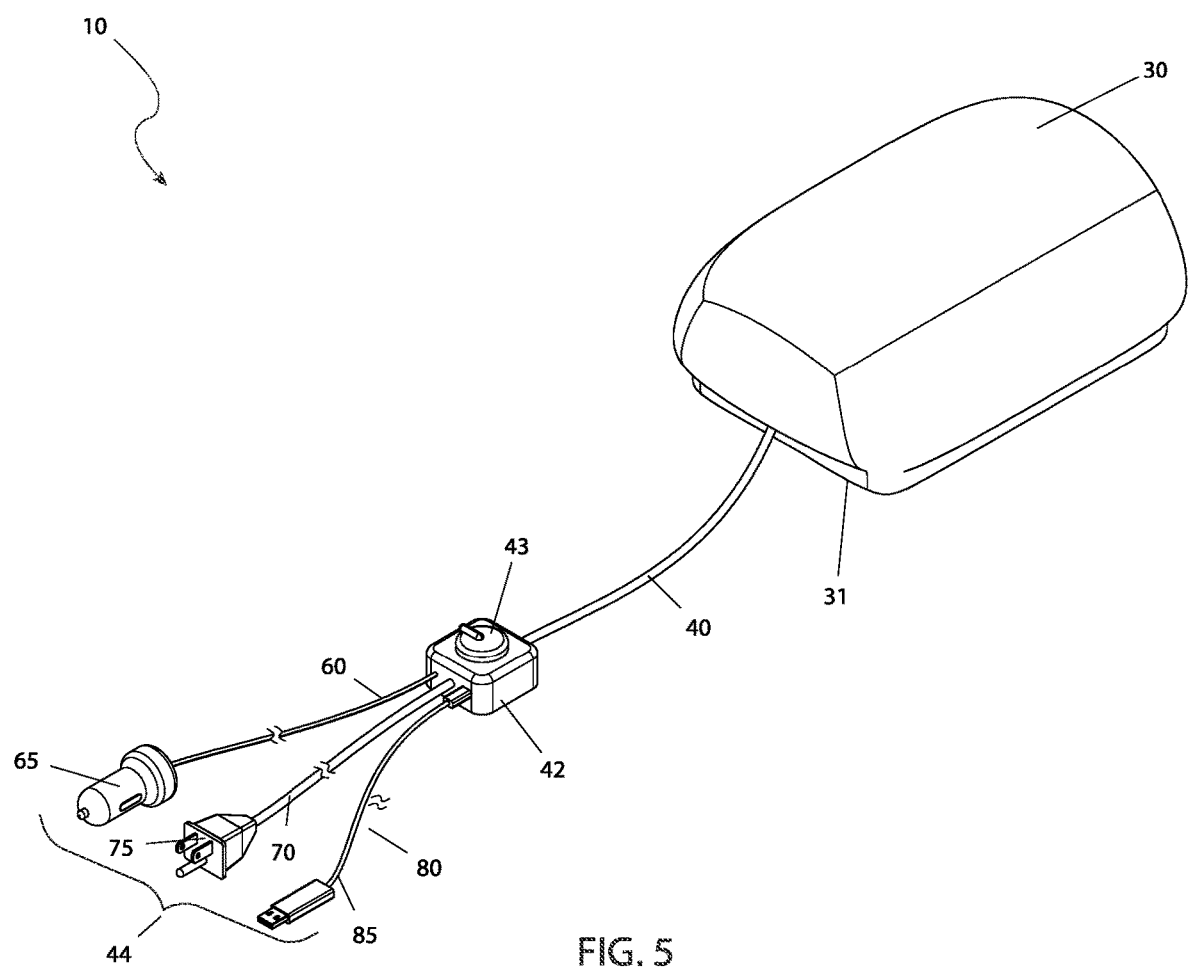
FIG. 5 is a top perspective view of the portable food warmer, according to the preferred embodiment of the present invention.

Referring to FIGS. 1 and 5, the present invention is a portable food warmer 10 which provides a means to quickly warm a desired foodstuff when in a remote location where there is electrical access but no conventional cooking appliances such as a microwave, toaster, oven, etc. The portable food warmer 10 includes a base 20, a cover 30 with a heating means (not shown) capable of being in electrical communication with a power supply, and a thermal bag 50. Foodstuffs are capable of being placed in the base 20, while the cover 30 is removably affixed to the base 20 and placed in electrical communication with a power source. A controller 42, wired electrically via a primary electrical cord 40 and a secondary electrical cord 44 controls the type and period of heating of the heating means in the cover 30. Additional information on the secondary electrical cord 44 will be provided herein below.

Figure 4:
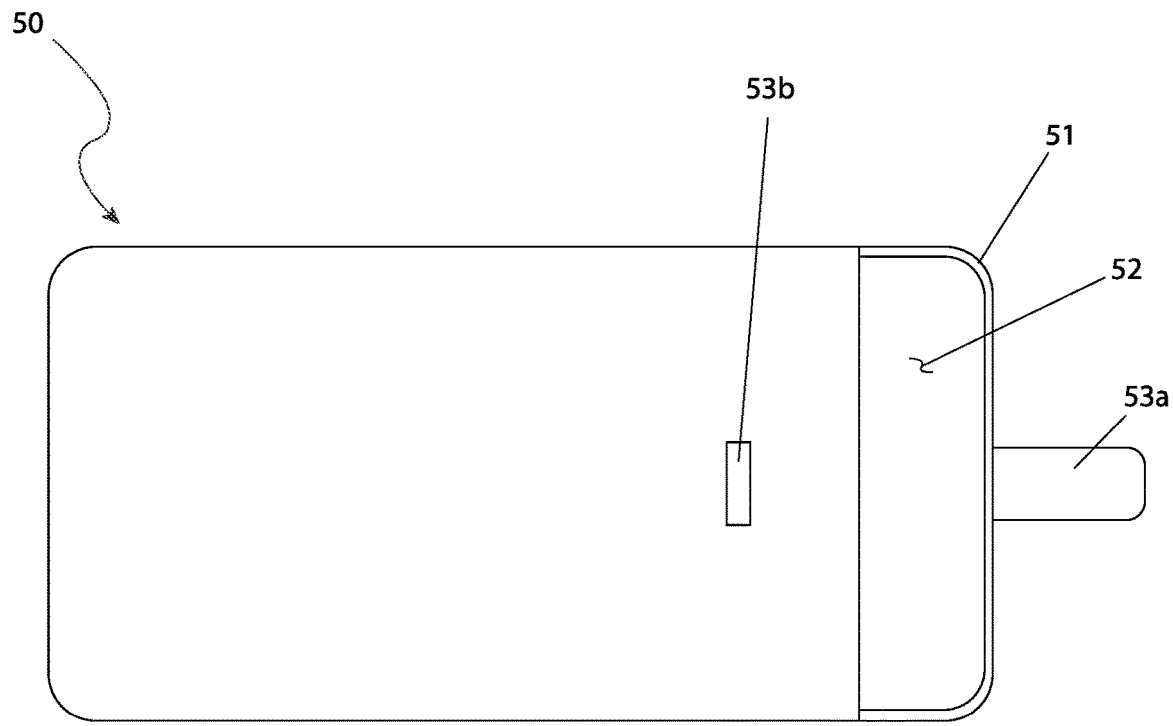
FIG. 4 is a top plan view of a thermal bag of the portable food warmer, according to the preferred embodiment of the present invention.

Referring now to FIG. 4, the foodstuffs can be separately transported in the thermal bag 50, such that cold food can remain cold until warmed by the portable food warmer 10, or warmed food can remain warmed when held within the thermal bag 50. The thermal bag 50 is manufactured out of material that prevents thermal communication with the external environment. The thermal bag 50 is generally rectangular in nature, having a bag interior 52 where the foodstuffs may reside. A flap 51 is an extended portion of one (1) side of the thermal bag 50 and has a first fastener 53b on an exterior used thereof. The opposing side of the thermal bag 50 from the flap 51 has a second fastener 53b, which is capable of mating with the first fastener 53a to seal the flap 51 to the thermal bag 50 and protect the foodstuffs within the bag interior 52.

Figure 2:
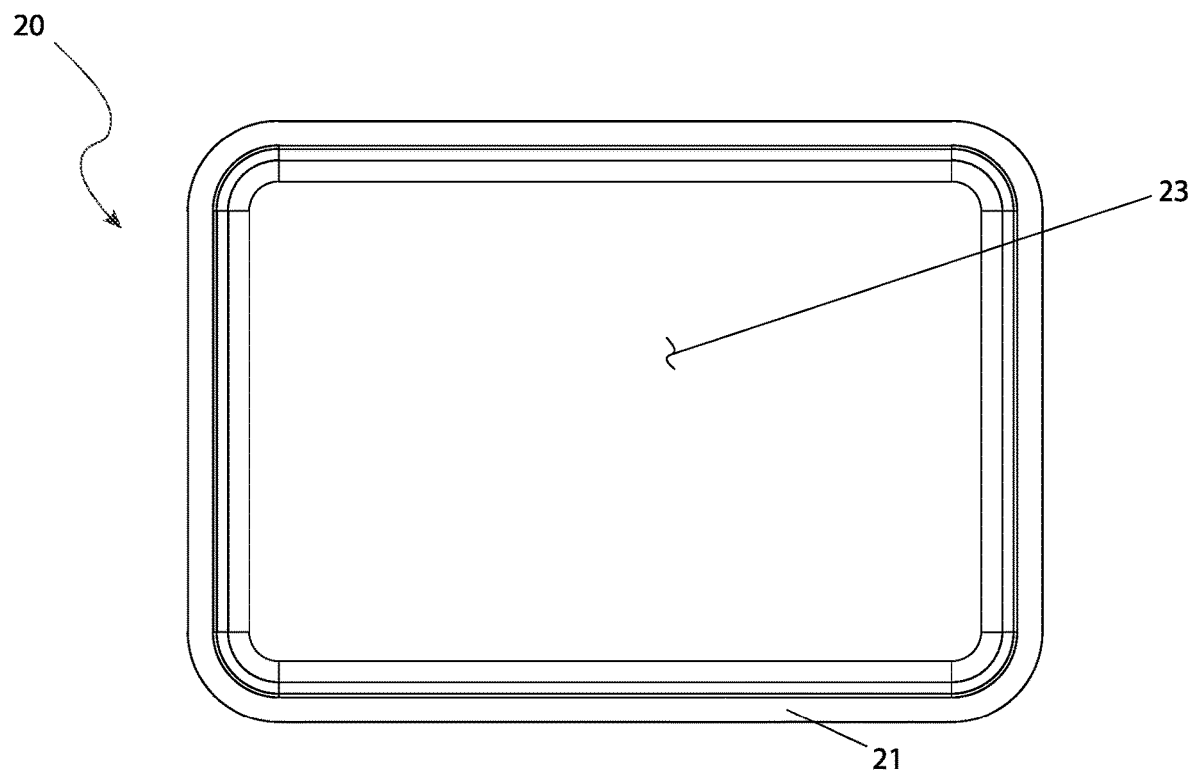
FIG. 2 is a top plan view of base of the portable food warmer, according to the preferred embodiment of the present invention.
Figure 3:
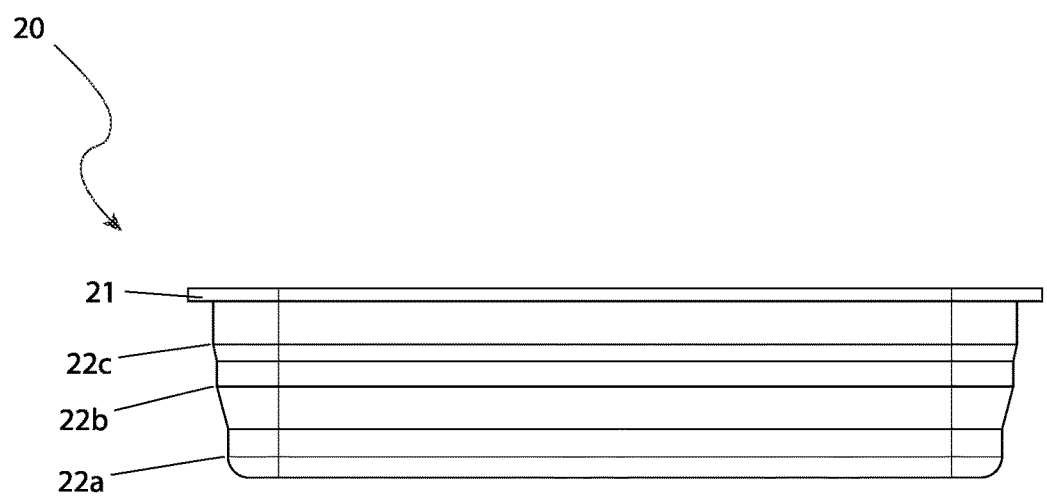
FIG. 3 is a side elevation view of base of the portable food warmer, according to the preferred embodiment of the present invention.

Referring now more closely to FIGS. 2 and 3, there is illustrated a base 20 of the portable food warmer 10. The base 20 is preferably rectangular in nature, generally having five (5) sides and an open top. The base 20 is preferably constructed out of an inert and resilient material capable of withstanding some impact force and elevated temperatures. The base 20 is collapsible, with segments that nest within each other. In the exemplary embodiment, there is a base first segment 22a that forms the floor of the base, a base second segment 22b attached to and capable of nesting within the base first segment 22a or expanding away therefrom, and a base third segment 22c attached to and capable of nesting within the base second segment 22b or expanding away therefrom. The base second segment 22b has a perimeter slightly larger than the base first segment 22a and the base third segment 22c has a perimeter slightly larger than the base second segment 22b. The base 20 therefore has a base interior 23 bound by the base first segment 22a, base second segment 22b, and base third segment 22c and is configurable via expansion and contraction as is necessary by the size and shape of the foodstuffs meant to be placed therein. About the upper perimeter of the base third segment 22c is a base perimeter edge 21. It is appreciated that any number and size of segments can be utilized for the base 20, including none at all.

Figure 6:
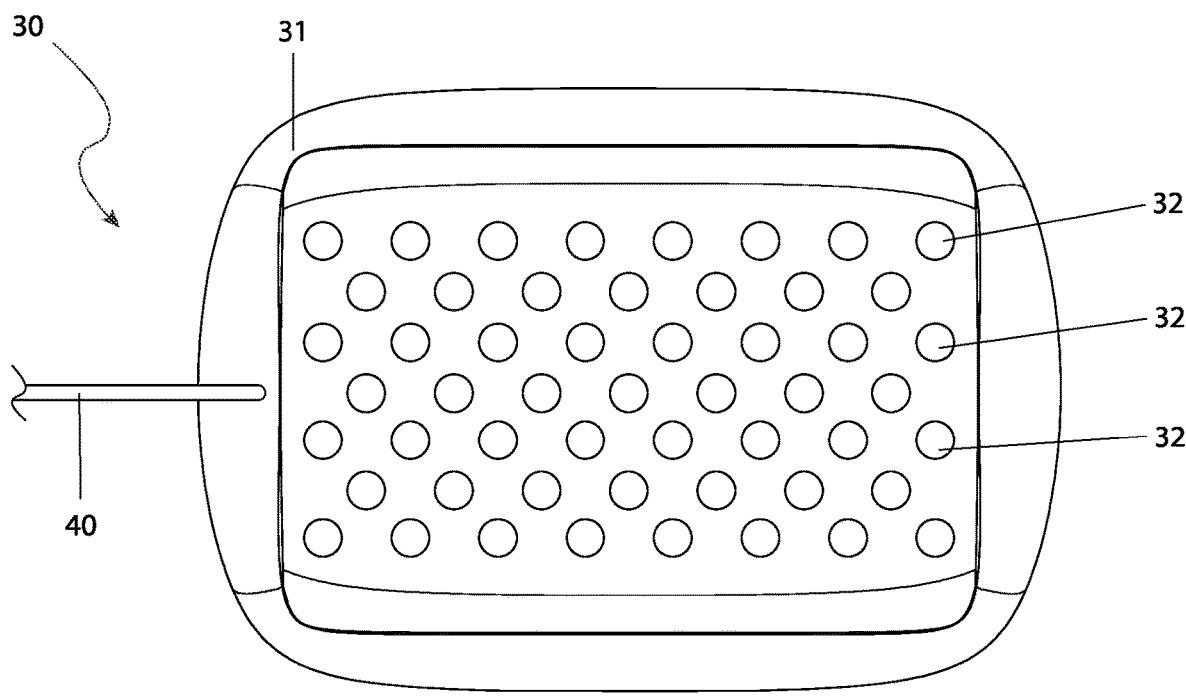
FIG. 6 is a bottom plan view of the cover of the portable food warmer, according to the preferred embodiment of the present invention.

Referring now to FIG. 5 and FIG. 6, a more detailed illustration and description of the cover 30 is provided. As mentioned above, the cover 30 incorporates a heating means (not shown) that is capable of providing heat in relation to an electrical connection. The heating means is capable of being in electrical communication with a controller 42 via a primary electrical cord 40. Such a heating means is preferably a set of resistant heating elements. A controller 42 is in-line with the primary electrical cord 40 and, via manipulation by the controller interface 43, can provide specific heating capabilities to the heating means. Such heating capabilities can be a timer, a rheostat or other means to provide a relative heating limit or scaling through pre-set heating temperatures, or the like. The secondary electrical cord 44 may be one (1) of three (3) user-driven choices. The first is a twelve-volt direct current (12-VDC) cord 60 complete with a cigarette lighter plug 65 for use in motor vehicles. The second is an AC power cord 70 complete with an AC power plug 75 for use with one hundred twenty-volt alternating current (120-VAC). And the third is a USB power cord 80 with a USB power plug 85 for use with USB power supplies and USB battery power packs.

The cover 30 is a flexible and dome-like structure with an open bottom end. The cover 30 is capable of withstanding elevated heating means and also is capable of withstanding a force of impact, such as preventing impalement or ripping. About the perimeter of the open bottom end is an elastic band 31 capable of removable firm securement of the cover 30 about the base perimeter edge 21 to cover the base 20, the base interior 23 and any foodstuffs therein. Spaced along the inner surface of the cover 30 is a plurality of vents 32, each in fluid communication with the heating means, so as to convey the heat produced by the heating means to the base interior 23 (and any foodstuffs residing therein) when the cover 30 is attached to the base 20.

Figure 7:
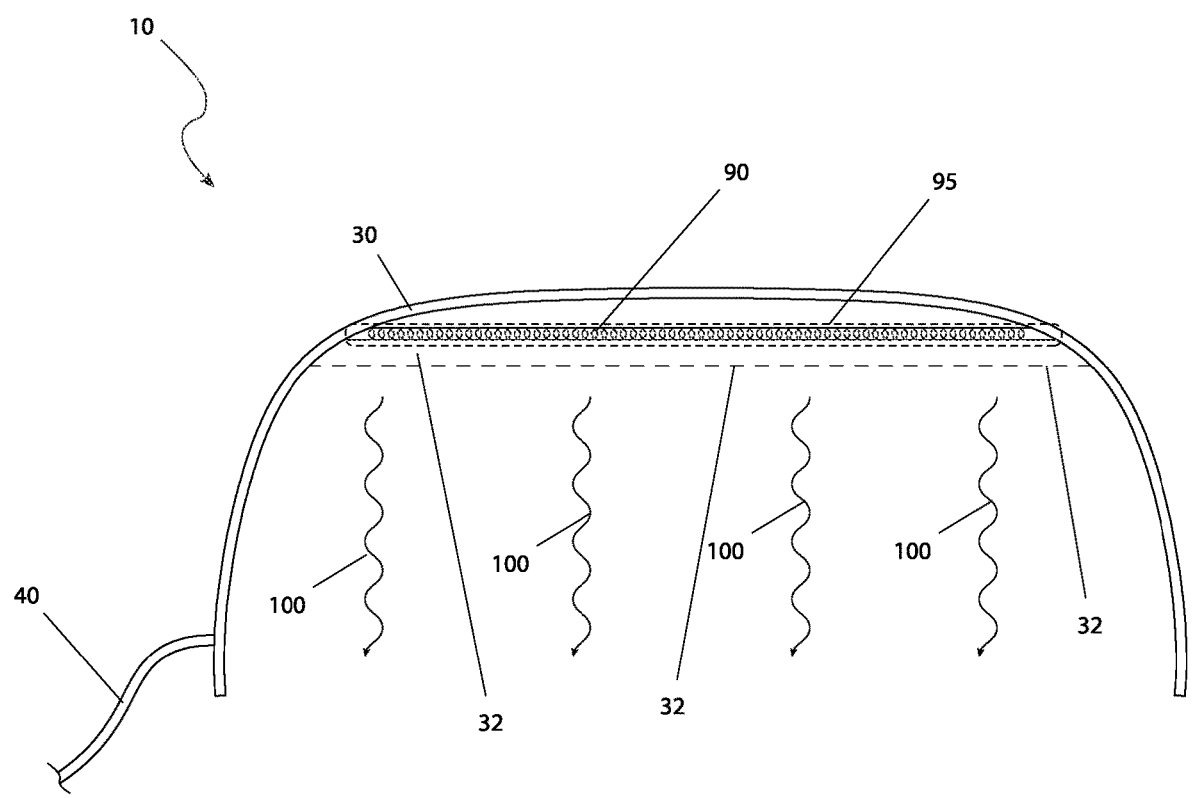
FIG. 7 is a cross sectional view of the cover as used with the portable food warmer, as seen along a Line I-I, as shown in FIG. 6; according to the preferred embodiment of the present invention.

Referring next to FIG. 7, a cross sectional view of the cover 30 as used with the portable food warmer 10, as seen along a Line I-I, as shown in FIG. 5, according to the preferred embodiment of the present invention is disclosed. The vents 32 are visible on the interior of the cover 30. An electrical heater 90 is located in the interstitial space 95 between the cover 30 and the vents 32. The electrical heater 90 is connected to the primary electrical cord 40 in a series fashion. This arrangement produces thermal energy 100 that heats the contents of the base 20 (as shown in FIG. 1).

Figure 8:
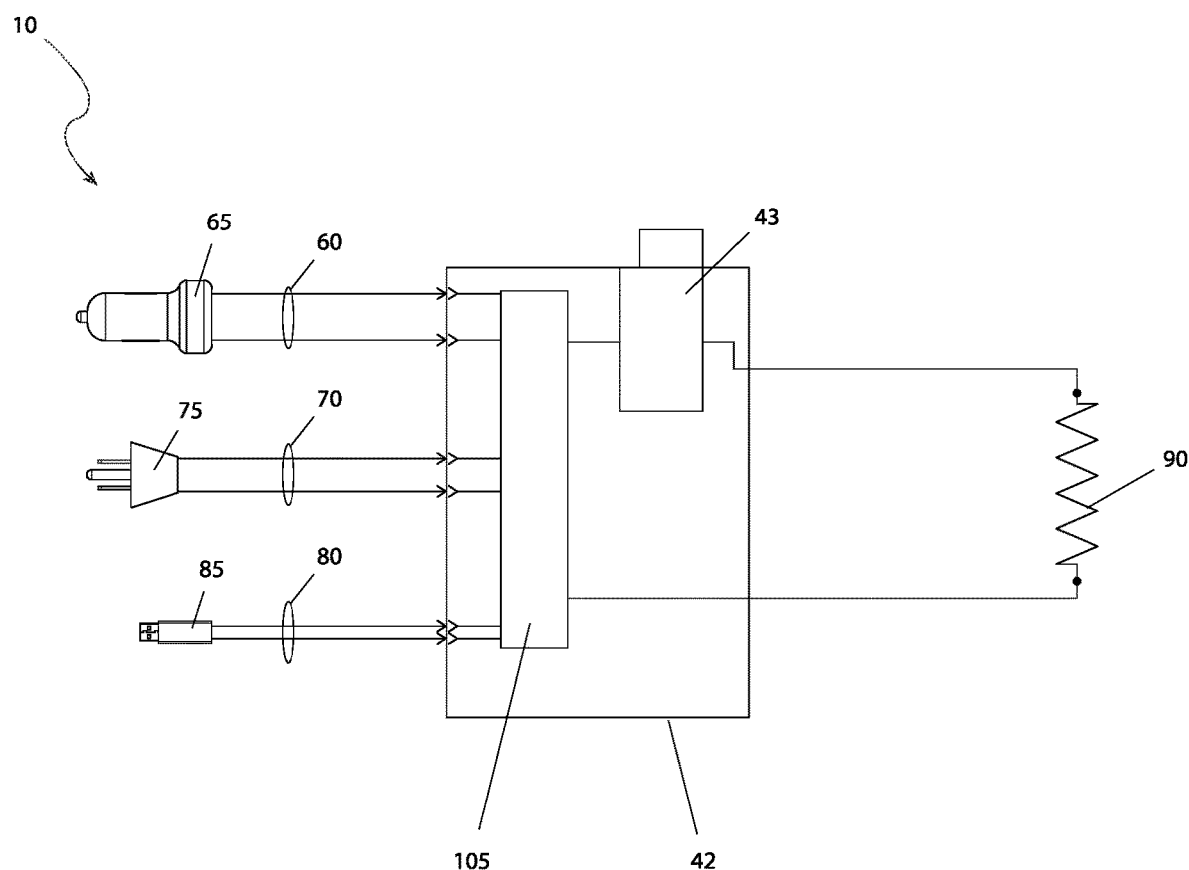
FIG. 8 is an electrical block diagram of the portable food warmer, according to the preferred embodiment of the present invention.

Referring to FIG. 8, an electrical block diagram of the portable food warmer 10, according to the preferred embodiment of the present invention is depicted. Electrical power for the portable food warmer 10 is provided by one of the three secondary power cords 44. In the case of usage in a motor vehicle, the user would connect the twelve-volt direct current (12-VDC) cord 60 with associated cigarette lighter plug 65 into the controller 42. In the case of use with one hundred twenty-volt alternating current (120-VAC) power, the user would connect the AC power cord 70 with associated AC power plug 75 into the controller 42. In the case of usage with USB power supplies and USB battery power packs, the user would connect the USB power cord 80 with associated USB power plug 85 into the controller 42. A voltage-current-frequency regulator 105 would convert the three (3) various inputs into a standard voltage, current and frequency as needed by the electrical heater 90. The resultant power from the voltage-current-frequency regulator 105 is then controlled by the controller interface 43 as aforementioned described before being passed to the electrical heater 90.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A portable food warmer consisting of:
   a base having a base first segment forming a floor of the base, a base second segment attached to and nesting within the base first segment or expanding away therefrom, and a base third segment attached to and nesting within the base second segment or expanding away therefrom, wherein the base defines a base interior and comprises an inert and resilient material capable of withstanding impact forces and elevated temperatures;
   a cover having an open bottom end and an elastic band disposed along a perimeter of the open bottom end, the cover being a flexible dome-like structure removably securable to a perimeter edge of the base and configured to cover the base interior, the cover comprising an electrical heater disposed in an interstitial space between the cover and a plurality of vents formed along an interior surface of the cover, wherein each of the vents is in fluid communication with the electrical heater to direct thermal energy to the base interior;
   a controller in electrical communication with the electrical heater via a primary electrical cord and a secondary electrical cord, the controller having a controller interface configured to provide specific heating capabilities including at least a timer or a rheostat;
   a voltage-current-frequency regulator in communication with the secondary electrical cord and configured to convert power from one of a twelve-volt direct current cord, a one hundred twenty-volt alternating current plug, or a USB power cord into a fixed voltage, current, and frequency output suitable for the electrical heater; and,
   a thermal bag having a bag interior, a flap extending from one side of the thermal bag with a first fastener disposed on an exterior of the flap, and a second fastener disposed on an opposing side of the thermal bag and configured to mate with the first fastener to enclose the foodstuffs held within the bag interior, wherein the thermal bag is formed from a material configured to inhibit thermal communication between the bag interior and an external environment.

2. The portable food warmer of claim 1, wherein the electrical heater and the plurality of vents are configured such that, when the cover is secured to the base, heat from the electrical heater is conveyed through the vents into the base interior to warm foodstuffs placed therein, and wherein the controller interface regulates the amount of thermal energy delivered based on user input received via the timer or rheostat.

* * * * *